United States Patent
Sato et al.

(10) Patent No.: US 6,852,192 B2
(45) Date of Patent: Feb. 8, 2005

(54) METHOD FOR PRODUCING HONEYCOMB SANDWICH PANEL

(75) Inventors: Keiichi Sato, Saitama-ken (JP); Yuki Kasahara, Saitama-ken (JP); Makoto Nasu, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/417,143

(22) Filed: Apr. 17, 2003

(65) Prior Publication Data

US 2003/0192642 A1 Oct. 16, 2003

Related U.S. Application Data

(62) Division of application No. 09/721,632, filed on Nov. 27, 2000, now Pat. No. 6,551,441.

(30) Foreign Application Priority Data

Nov. 26, 1999 (JP) .............................. 11-336774

(51) Int. Cl.[7] .............................................. B32B 31/20
(52) U.S. Cl. ................................... 156/292; 156/307.1
(58) Field of Search ............................... 156/285–286, 156/307.1, 307.3, 382, 292; 428/116–118, 73; 52/793.1; 264/510–511, 257–258, 319

(56) References Cited

U.S. PATENT DOCUMENTS

| 4,910,065 A | * | 3/1990 | McKinney .................. 428/116 |
| 5,635,013 A | | 6/1997 | Boi |
| 5,897,739 A | * | 4/1999 | Forster et al. .............. 156/285 |
| 6,197,146 B1 | | 3/2001 | Suci et al. |
| 6,261,675 B1 | * | 7/2001 | Hsiao et al. ................. 428/219 |
| 6,551,441 B1 | * | 4/2003 | Sato et al. ................... 156/323 |
| 2003/0190452 A1 | * | 10/2003 | Lucas et al. ................. 428/116 |

FOREIGN PATENT DOCUMENTS

JP   57-116635   7/1982

OTHER PUBLICATIONS

Copy of claims from U.S. Appl. No. 09/832,794.*

* cited by examiner

*Primary Examiner*—Blaine Copenheaver
*Assistant Examiner*—Jessica Rossi
(74) *Attorney, Agent, or Firm*—Sughrue Mion, PLLC

(57) ABSTRACT

A honeycomb sandwich panel is produced by (a) mounting a honeycomb core on a lower prepreg laminate skin placed on a forming die, (b) superimposing thereon an upper prepreg laminate skin to cover the honeycomb core, (c) mounting flat plate-shaped elastic jigs on a portion of the resulting assembly where the lower prepreg laminate skin and the upper prepreg laminate skin are overlapping each other, (d) superimposing flat plate-shaped press jigs on the elastic jigs, and (e) heating the assembly under pressure for adhesion forming.

4 Claims, 5 Drawing Sheets

METHOD FOR PRODUCING HONEYCOMB SANDWICH PANEL

This is a divisional of application Ser. No. 09/721,632, filed Nov. 27, 2000 now U.S. Pat. No. 6,551,441; the disclosure of which is incorporated herein by reference.

FIELD OF THE INVENTION

The present invention relates to a method for producing a honeycomb sandwich panel suited for the production of a panel structure having a curved surface; particularly to a method for producing a honeycomb sandwich panel while preventing a honeycomb core from crushing, thereby simplifying the production process and thus reducing the cost and weight of the product.

BACKGROUND OF THE INVENTION

Honeycomb sandwich panels constituted by a pair of prepreg skins and a honeycomb core interposed between the skins are light in weight and superior in strength and rigidity; therefore, they are used as structural members of aircraft, automobiles, etc. These honeycomb sandwich panels are generally produced by first cutting a honeycomb material into a desired shape to form a honeycomb core, covering both sides of the honeycomb core with prepreg laminate skins, mounting the resulting assembly on a forming die, if necessary, with an adhesive between the honeycomb core and the prepreg laminate, and heating the assembly under pressure for adhesion forming. In this production method, however, the edge of the honeycomb core is unable to withstand the forming pressure applied, resulting in frequent deformation (crush) of the edge. Therefore, it is desired to develop a method for producing a honeycomb sandwich panel while preventing the crush of core edge.

It is known that the crush of honeycomb core is caused by slipping of the prepregs in the skins. Japanese Patent Publication No 59-42621, for example, discloses a method for preventing the above slipping by causing projections (slipping-preventing means) of a forming die to pierce into a portion of the honeycomb sandwich panel where a lower prepreg laminate and an upper prepreg laminate are overlapping each other, inserting the projections into a press plate made of an elastic material, thereby fixing the prepreg laminates on and above the forming die. In this method using a forming die having projections, however, the projections are dangerous to an operator; the forming operation is troublesome because periodic cleaning and repair for projections are necessary; and the projections become an obstacle in sealing the forming die with a vacuum bag. Besides, there was also proposed, for example, a method for preventing the slipping of honeycomb core by fixing prepreg laminates using an adhesive tape, fixing pins, a sand paper or the like. None of these methods, however, is practical because of the problems such as increased number of steps, increased cost for forming, or the like.

A method is also known which comprises filling the edge of honeycomb core with a filler curable at room temperature, and curing the filler to increase the strength of the honeycomb core. In this method, however, widening of filling area for the prevention of crush invites increased panel weight, against the aim of lighter product weight. Moreover, because the cured filler is hard and fragile, the honeycomb sandwich panel produced may suffer cracking when the panel has a curved surface.

Further, a method was proposed which comprises providing the edge of a honeycomb core with a tapered portion to lower pressure in the forming process. The forming pressure lower than usual (about 6 kgf/cm$^2$), however, tends to invite insufficient forming owing to pressure shortage in portions of skins where no honeycomb core is interposed. Also, an increase in the degree of tapering at the edge of honeycomb core incurs an increase in oblique dead space in a tapered portion.

OBJECT OF THE INVENTION

Thus, the object of the present invention is to provide a method for producing a honeycomb sandwich panel suited for the production of a panel structure having a curved surface while preventing the crush of a honeycomb core, thereby achieving simplification of the production steps and reduction in product cost and weight.

DISCLOSURE OF THE INVENTION

As a result of intensive research in view of the above object, the inventors have found that a honeycomb sandwich panel constituted by a pair of prepreg laminate skins and a honeycomb core interposed between the skins can be produced without crushing the honeycomb core by using flat plate-shaped elastic jigs and flat plate-shaped press jigs during pressurization, or by making wider a portion of the panel where a pair of prepreg laminate skins are overlapping each other. The present invention has been completed based on this finding.

The first method for producing a honeycomb sandwich panel according to the present invention comprises the steps of (a) mounting a honeycomb core on a first prepreg laminate placed on a forming die, (b) superimposing thereon a second prepreg laminate to cover the honeycomb core to form an assembly, (c) mounting flat plate-shaped elastic jigs on a portion of the resulting assembly where the first prepreg laminate and the second prepreg laminate are overlapping each other, (d) superimposing simple flat plate-shaped press jigs independently of the shape of said forming die used on said elastic jigs so as to prevent slipping of said prepreg laminate at the following step (e), and (e) heating said assembly under a pressure of 6 to 7 kgf/cm$^2$ for adhesion forming.

The second method for producing a honeycomb sandwich panel according to the present invention comprises the steps of (a) mounting a honeycomb core on a first prepreg laminate placed on a forming die, (b) superimposing thereon a second prepreg laminate to cover the honeycomb core to form an assembly, and (c) heating said assembly under a pressure of 6 to 7 kgf/cm$^2$ for adhesion forming, wherein a portion of the assembly where the first prepreg laminate and the second prepreg laminate are overlapping each other has a width of 500 mm or more.

In the first method for producing a honeycomb sandwich panel, the elastic jigs are preferably made of a silicone rubber, and the press jigs are preferably made of aluminum. Further, each of the elastic jigs and the press jigs preferably has a width of 40 to 250 mm and a thickness of 0.3 to 2 mm. The forming die has a forming portion above which the honeycomb core is mounted and an edge portion above which the elastic jigs and the press jigs are mounted, an angle between the forming portion and the edge portion being preferably 30 to 180°.

In the first and second methods for producing a honeycomb sandwich panel, the adhesion forming is preferably conducted at a pressure of 6 to 7 kgf/cm$^2$. The honeycomb core preferably has a tapered portion formed by chamfering, and the edge formed by the lower and upper surfaces of the tapered portion, an angle between a lower surface and an upper surface of the tapered portion (angle of honeycomb edge) being preferably 30 to 45°.

PREFERRED EMBODIMENTS OF THE INVENTION

Figure 1:
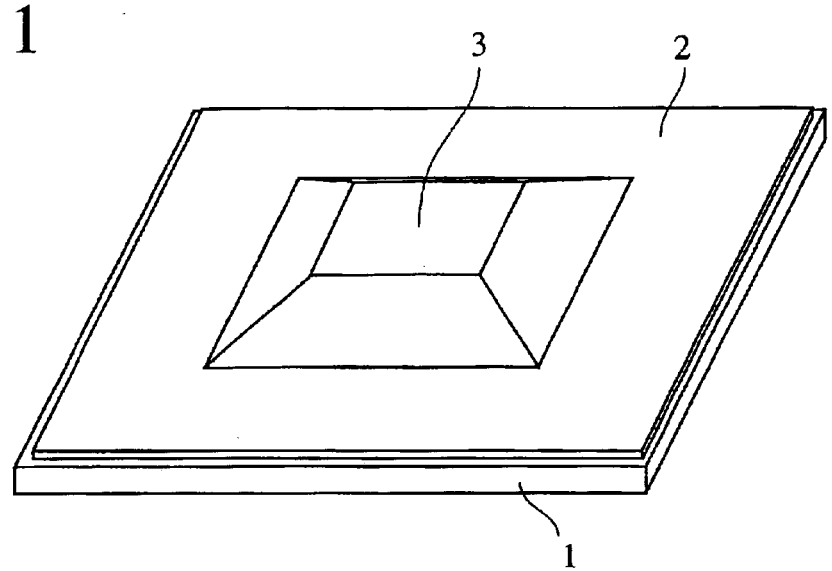
FIG. 1 is a perspective view showing an example of the first method for producing a honeycomb sandwich panel according to the present invention.
Figure 2:
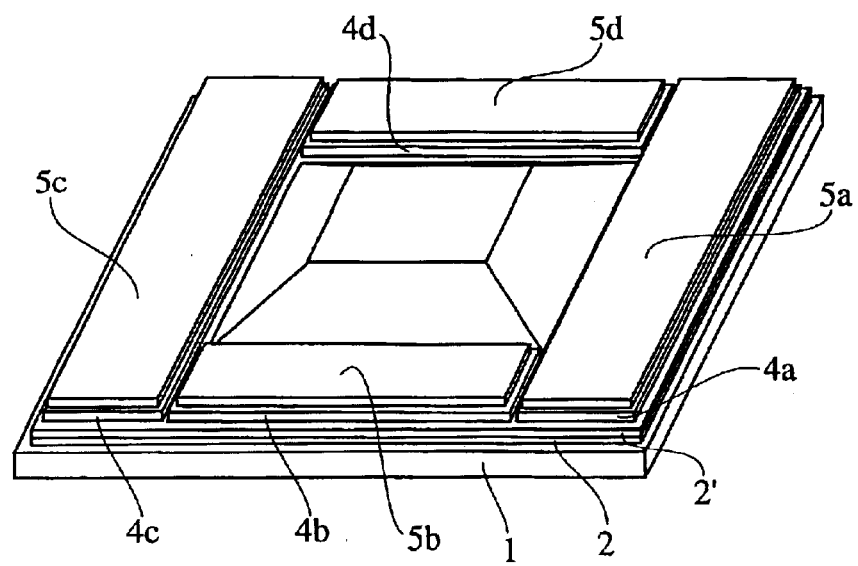
FIG. 2 is a perspective view showing an example of the first method for producing a honeycomb sandwich panel according to the present invention.
Figure 3A:
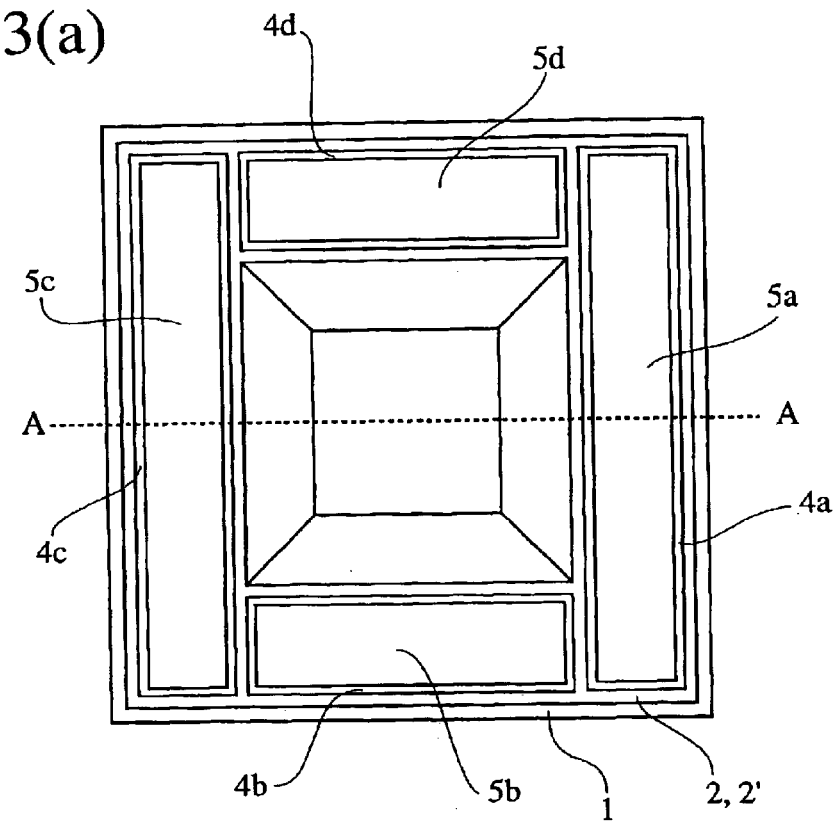
FIG. 3(a) is a top view showing an example of the first method for producing a honeycomb sandwich panel according to the present invention.

The method for producing a honeycomb sandwich panel according to the present invention will be explained hereinafter with reference to FIGS. 1 to 9. FIGS. 1 and 2 are perspective views each showing an example of the first production method of the present invention. FIG. 3(a) is a top view of FIG. 2, and FIG. 3(b) is a fragmentary sectional view taken along the line A—A in FIG. 3(a).

In the first method of the present invention, a honeycomb core 3 is mounted on a first prepreg laminate 2 (for an outer skin) placed on a forming die 1 as shown in FIG. 1. As shown in FIG. 2, a second prepreg laminate 2' (for an inner skin) is then superimposed thereon to cover the honeycomb core 3. On the portion of the resulting assembly where the prepreg laminates 2 and 2' are overlapping each other are mounted flat plate-shaped elastic jigs 4a, 4b, 4c and 4d. With flat plate-shaped press jigs 5a, 5b, 5c and 5d superimposed thereon, the assembly of the first prepreg laminate 2, the honeycomb core 3 and the second prepreg laminate 2' is heated under pressure for adhesion forming. In this method, the slipping of the prepreg laminates is prevented by friction enhanced by the applied pressure and the edge effect of the press jigs.

Figure 4:
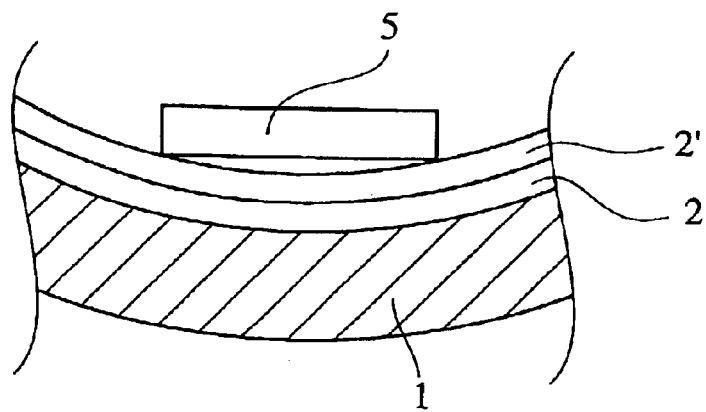
FIG. 4 is a fragmentary sectional view showing a manner in which a honeycomb sandwich panel is produced on a forming die having a curved surface, using only a press jig without an elastic jig.
Figure 5:
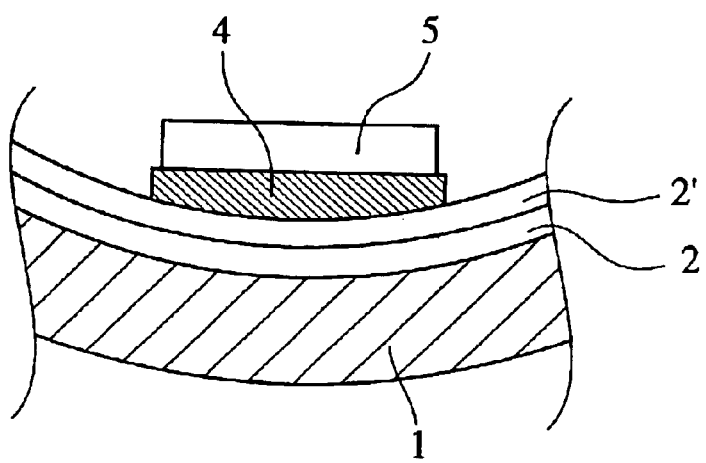
FIG. 5 is a fragmentary sectional view showing a case of using a forming die having a curved surface, in the first method for producing a honeycomb sandwich panel according to the present invention.

The shapes of the elastic jigs and the press jigs used in the first method of the present invention may be simple flat plates independently of the shape of the forming die used. The crush of the honeycomb core can be prevented by using the press jigs alone without elastic jigs. In using the press jigs alone, however, when the forming die 1 is not flat plate-shaped and has, for example, a curved surface as shown in FIG. 4, insufficient forming takes place in the portion of the prepreg laminates where no honeycomb core is interposed, owing to (a) the presence of a space formed by the second prepreg laminate 2' and the press jigs and (b) the resulting pressure shortage. Even in such a case, the elastic jigs 4 as shown in FIG. 5 can transmit the applied pressure uniformly to a product to be formed, owing to the elasticity of the jigs 4.

Figure 3B:
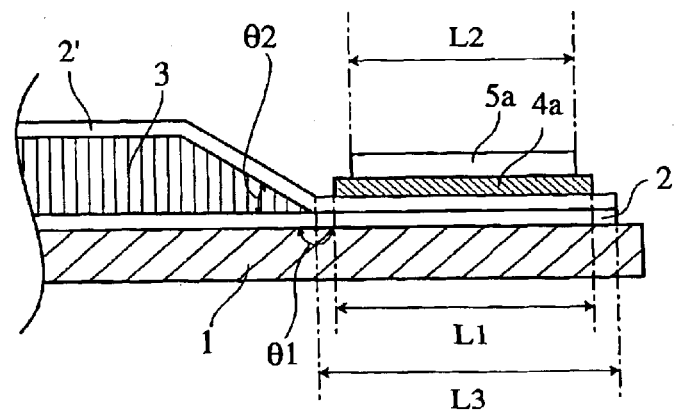
FIG. 3(b) is a fragmentary sectional view taken along the line A—A in FIG. 3(a)

In FIG. 3(b), the width $L_1$ of the elastic jig 4a and the width $L_2$ of the press jig 5a may each be 40 mm or more for sufficient prevention of crush and are preferably 40 to 250 mm for practical application. The thickness of each elastic jig 4a and each press jig 5a is preferably 0.3 to 2 mm, more preferably 0.5 to 1 mm, because the thickness of less than 0.3 mm gives no sufficient effects and the thickness of more than 2 mm makes it difficult to form the jig in a panel shape. Because the elastic jig 4a and the press jig 5a are very thin, they neither become obstacle in applying a vacuum bag nor break the vacuum bag.

The elastic jig 4a is preferably made of an elastomer having flexibility and heat resistance, more preferably of a silicone rubber. The press jig 5a is preferably made of a material excellent in strength and, rigidity and low in thermal expansion. As such a material, there can be mentioned metals such as steel, stainless steel, aluminum and the like; graphite; carbon fiber-reinforced resins, and so forth. The press jig 5a is most preferably made of aluminum.

Figure 6:
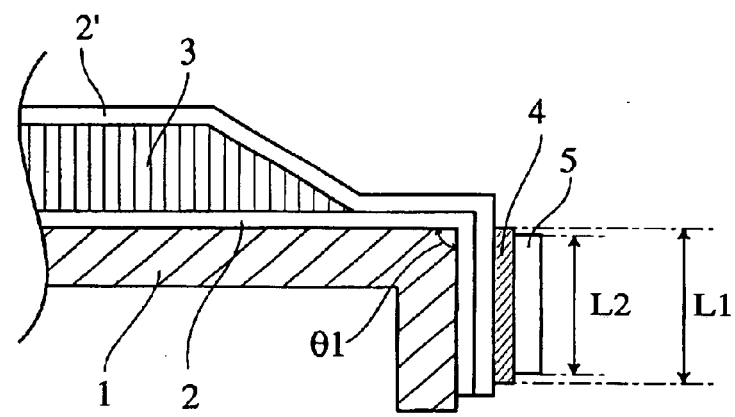
FIG. 6 is a fragmentary sectional view showing a case of using a forming die having an angle $\theta_1$ of 90° between the forming portion and the edge portion, in the first method for producing a honeycomb sandwich panel according to the present invention.

The forming die used in the present invention has a forming portion above which the honeycomb core is mounted, and an edge portion above which the elastic jig 4a and the press jig 5a are mounted. An angle $\theta_1$ between the forming portion and the edge portion is preferably 30 to 180°. The angle $\theta_1$ is more preferably 45 to 90°, because the honeycomb core is sufficiently prevented from crushing even when the widths $L_1$ and $L_2$ of the elastic jig 4a and the press jigs 5a are made smaller. An example of the forming die having an angle $\theta_1$ of 90° is shown in FIG. 6.

Figure 7:
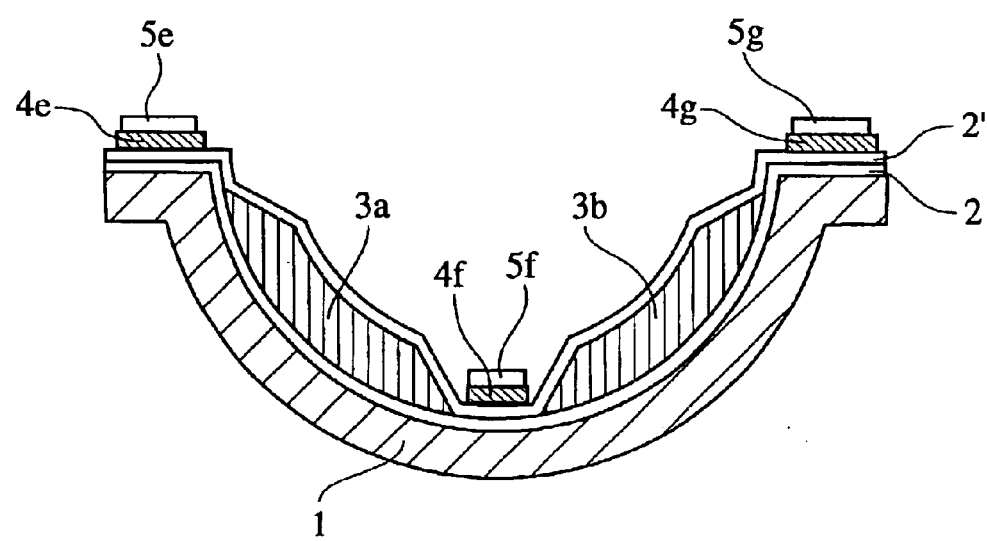
FIG. 7 is a sectional view showing a case of using a forming die having a curved surface, in the first method for producing a honeycomb sandwich panel according to the present invention.

The first production method of the present invention using a forming die having a curved surface is exemplified in FIG. 7. Because the shape of the forming die used in the present invention is not critical, the forming die may have, for example, a flat-plate shape or a curved surface. The forming die may be made of, for example, metals or carbon fiber-reinforced resins.

The honeycomb core preferably has a tapered portion formed by chamfering. In FIG. 3(b), the edge angle $\theta_2$ of the honeycomb core may be 30 to 90°, and preferably 30 to 45° for sufficient prevention of the crushing of the honeycomb core. In the method of the present invention, the edge angle of the honeycomb core can be made larger than those (usually 30° or less) in conventional methods. Therefore, the tapered portion (a dead space) can be made small, with the freedom of design enhanced.

The materials of the honeycomb core may be papers, papers impregnated with resins, plastics, aluminum, steel, etc. Aramid fiber-reinforced thermosetting resins having high specific strength are preferably used. In that case, the thermosetting resins are preferably phenolic resins.

As the prepreg, there can be used those obtained by impregnating a woven fabric of reinforcing fibers such as carbon fibers, glass fibers, aramid fibers or the like with a thermosetting resin or a thermoplastic resin. The thermosetting resin is preferably an epoxy resin or the like, and the thermoplastic resin is preferably nylon or the like.

By the method of the present invention, the crush of honeycomb core edge can be prevented even under high-pressure forming. The forming pressure employed in the present invention is preferably 5 to 7 kgf/cm$^2$, more preferably 6 to 7 kgf/cm$^2$. Such forming at a pressure higher than in conventional methods (using 3 to 4 kgf/cm$^2$) incurs no insufficient forming due to pressure shortage.

The heating temperature is preferably 120 to 250° C. in general, although it may slightly differ depending upon the kind of the thermosetting or thermoplastic resins contained in the prepreg.

In the second production method of the present invention, neither elastic jigs nor press jigs are used unlike the first production method, and instead the width of the panel portion where the lower prepreg laminate skin and the upper prepreg laminate skin are overlapping each other is made larger, thereby intensifying the friction of the prepregs and thus preventing the slipping of the prepregs in the laminates, leading to the prevention of the crush of the honeycomb core.

Figure 8:
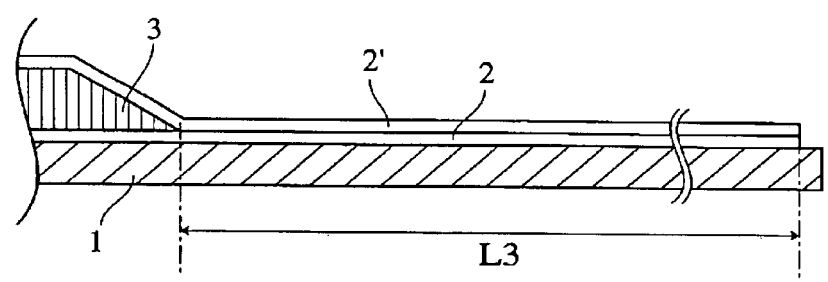
FIG. 8 is a fragmentary sectional view showing an example of the second method for producing a honeycomb sandwich panel according to the present invention.

FIG. 8 is a fragmentary sectional view showing an example of the second production method of the present invention. First, a honeycomb core 3 is mounted on a prepreg laminate 2 as a lower skin placed on a forming die 1, and a prepreg laminate 2' is superimposed as an upper skin thereon to cover the honeycomb core 3. The resulting assembly is heated under pressure to cause adhesion forming. In order to effectively prevent the crush of the honeycomb core, the width $L_3$ of the portion where the prepreg laminate 2 and the prepreg laminate 2' are overlapping each other, is preferably 500 mm or more, more preferably 500 to 600 mm. Further in the present method, cost reduction is achieved because no jigs or the like are used.

All of the forming die, the honeycomb core, the prepreg laminates, the forming pressure, the forming temperature, etc. used in the second production method may be the same as those used in the first production method in shape and material.

Figure 9:
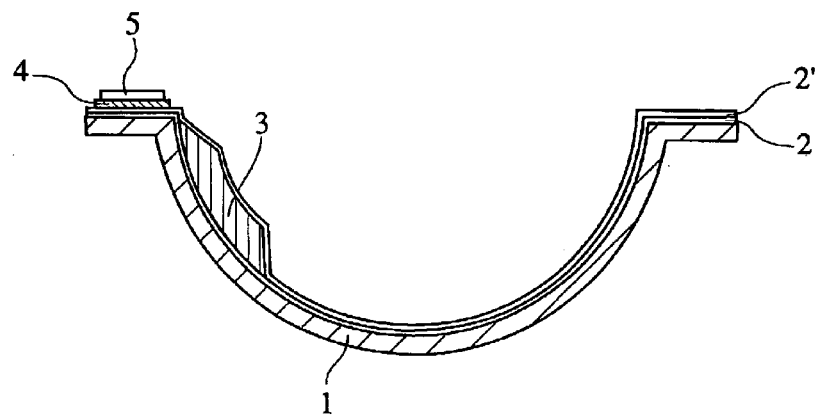
FIG. 9 is a sectional view showing an example of the combined use of the first and second production methods, using a forming die having a curved surface.

FIG. 9 is a sectional view showing an example of the forming of a honeycomb sandwich panel using a forming die having a curved surface. An elastic jig 4 and a press jig 5 are mounted at the left side of the honeycomb core 3, because the width of the panel portion, where a prepreg laminate 2 (a lower skin) and a prepreg laminate 2' (an upper skin) are overlapping each other, is small at the left side of the honeycomb core 3, while neither elastic jig 4 nor press jig 5 is used at the right side of the honeycomb core 3 because the width of the above overlapping portion is sufficiently large at the right side of the honeycomb core 3. As in FIG. 9, the first and second production methods of the present invention may be used in combination.

In the production method of the present invention, an adhesive may be used if necessary between the individual layers of the panel; and a vacuum bag, a sealing agent or the like may be used during adhesion forming.

Though the method for producing a honeycomb sandwich panel according to the present invention has been explained above with reference to the attached drawings, the present invention is not restricted thereto, and any modifications are possible unless the scope and spirit of the present invention are changed.

As described in detail above, the method for producing a honeycomb sandwich panel according to the present invention can prevent the crush of the honeycomb core during forming by using elastic jigs and press jigs all of simple shape, or by making large the width of the panel portion where the prepreg laminates are overlapping each other. Further in the present production method, the production steps can be simplified with product cost and weight reduced, because it is not necessary to process a forming die into a complex shape or to use a fixing jig, a filler or the like. Furthermore in the present production method, insufficient forming due to pressure shortage can be avoided because forming at an ordinary pressure (about 6 kgf/cm$^2$) is possible. The method of the present invention is also applicable to the production of a honeycomb sandwich panel having a curved surface.

What is claimed is:

1. A method for producing a honeycomb sandwich panel, comprising the steps of (a) mounting a honeycomb core on a first prepreg laminate placed on a forming die, (b) superimposing on said first prepreg laminate a second prepreg laminate to cover said honeycomb core to form an assembly, said first prepreg laminate being in direct contact with said second prepreg laminate, and (c) heating said assembly under a pressure of 6 to 7 kgf/cm$^2$ for adhesion forming, wherein a portion of said assembly, only where said first prepreg laminate and said second prepreg laminate are overlapping each other and are in said direct contact, has a width of 500 mm or more.

2. The method according to claim 1, wherein said width is 500 to 600 mm.

3. The method for producing a honeycomb sandwich panel according to claim 1, wherein said honeycomb core has a tapered portion formed by chamfering, an angle between the upper and lower surfaces of said tapered portion being 30 to 45°.

4. The method according to claim 3, wherein said width is 500 to 600 mm.

* * * * *